Oct. 29, 1929.                K. NISHIO                    1,733,312
                          GEOLOGICAL SAMPLER
                          Filed April 15, 1925
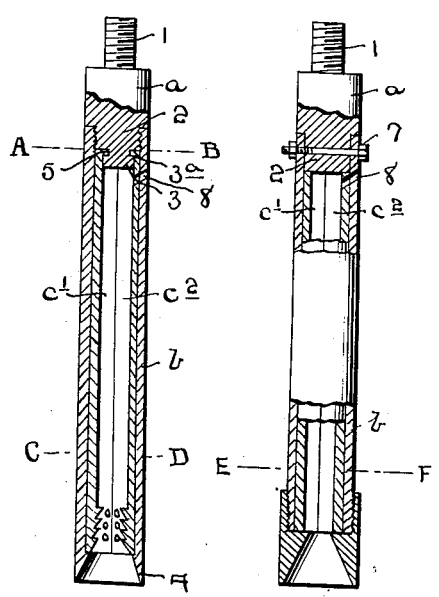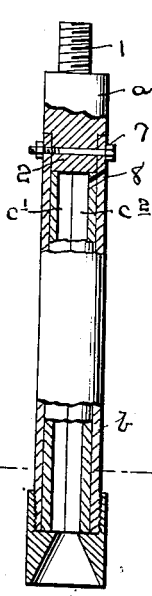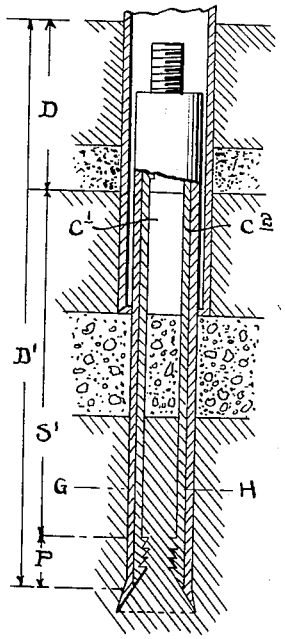
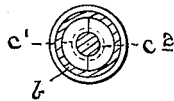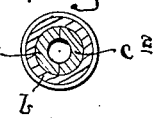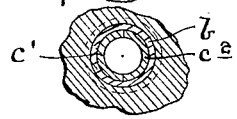
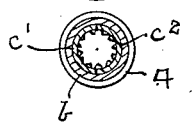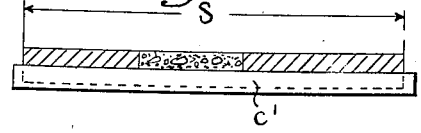
Inventor
K. Nishio
By Marks & Clerk
   Attys.

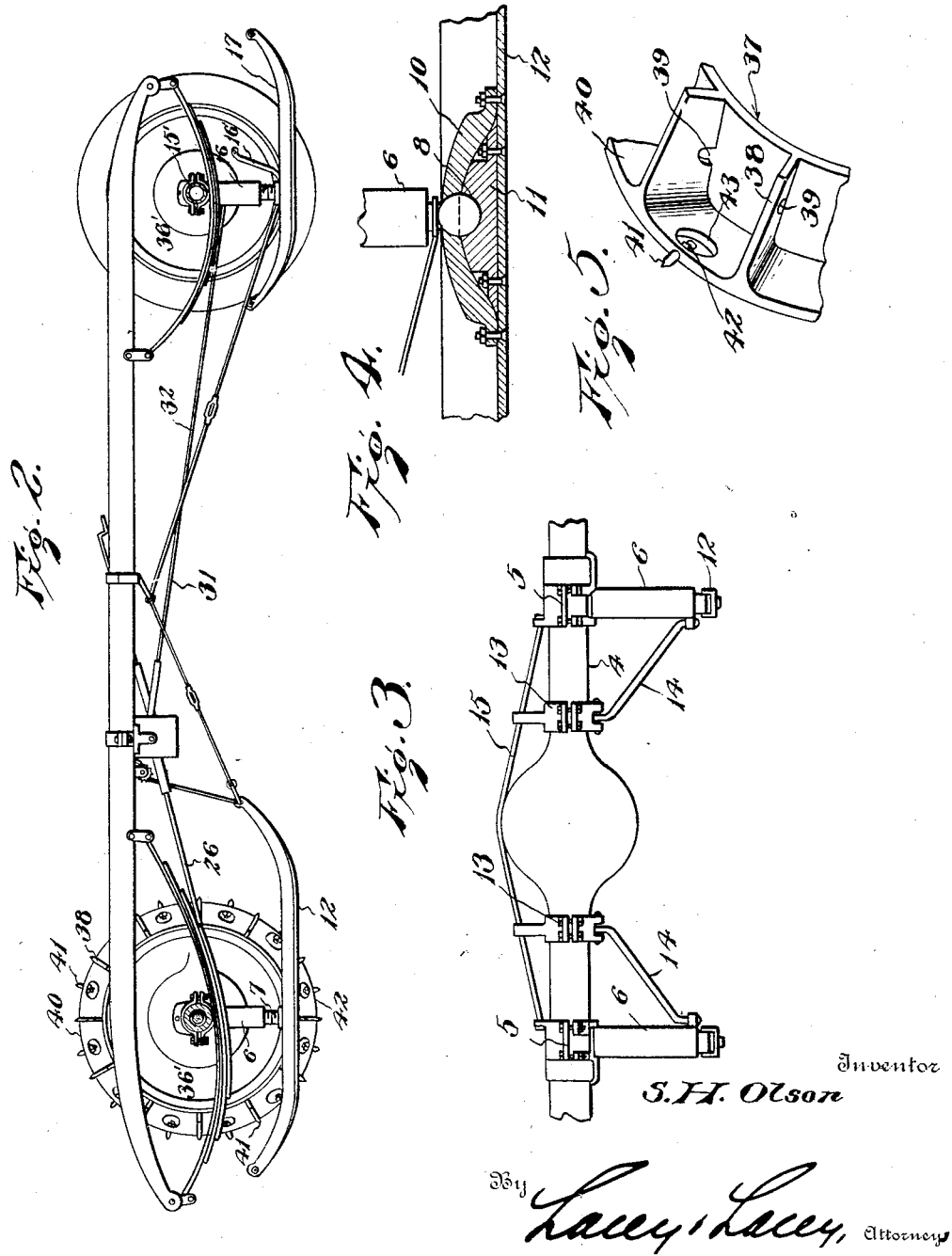

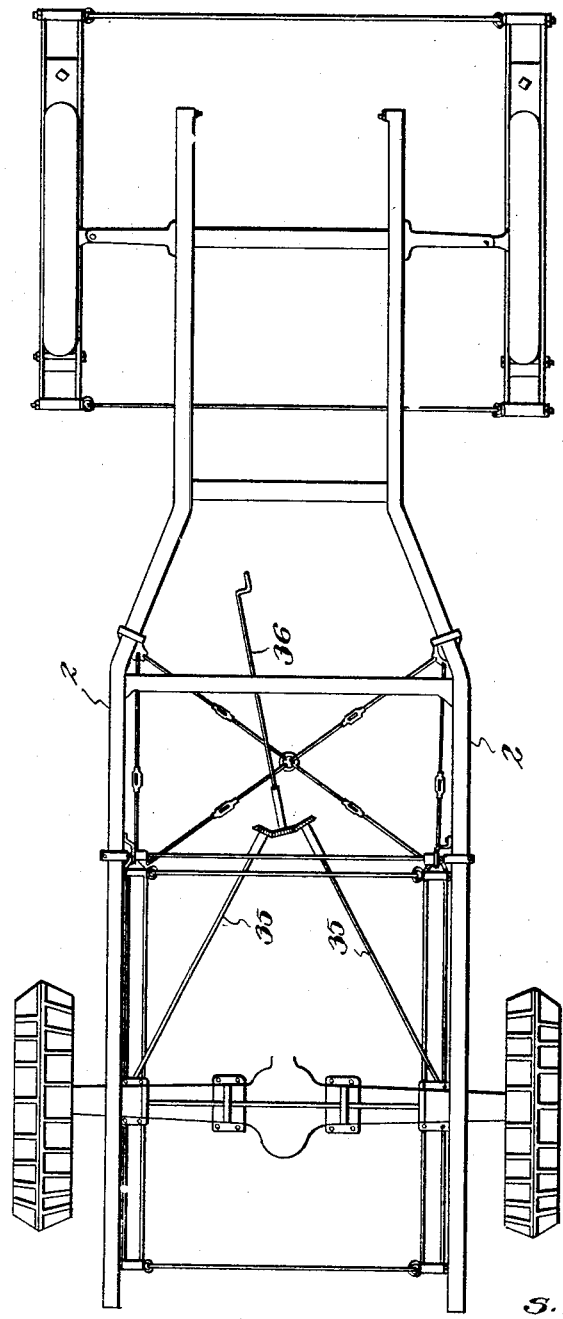

Patented Oct. 29, 1929

1,733,313

UNITED STATES PATENT OFFICE

SWAN H. OLSON, OF SARATOGA, WYOMING

RUNNER ATTACHMENT FOR AUTOMOBILES

Application filed November 8, 1928. Serial No. 318,030.

The present invention is directed to improvements in runner attachments for automobiles.

The primary object of the invention is to provide a device of this character which can be easily and quickly installed upon an automobile whether of the four or two wheel driven type.

Another object of the invention is to provide a device of this character so constructed that the runners can be conveniently raised or lowered, as desired.

Another object of the invention is to provide a device of this character including runners having conventional form of screw jacks connecting the runners and frame of the motor vehicle, said jacks being simultaneously operable to raise or lower the runners, as the occasion may require.

With these and other objects in view, this invention resides in the novel features of construction, formation, combination and arrangement of parts to be hereinafter more fully described, claimed and illustrated in the accompanying drawing, in which:—

Figure 1 is a plan view showing the device used in connection with a four wheeled drive vehicle.

Figure 2 is a side elevation of the same.

Figure 3 is a fragmentary rear view.

Figure 4 is a fragmentary longitudinal sectional view through one of the runners showing the jack connection.

Figure 5 is a fragmentary prospective view of the traction member.

Figure 6 is a top plan view of the device shown in connection with a two wheeled drive vehicle.

Referring to the drawings 1 designates the frame of a motor vehicle which as usual consists of side sills 2 and front and rear axles 3 and 4 respectively.

The rear axle 4 has a pair of clamps 5 engaged thereon which have carried thereby screw jacks 6, the screws 7 thereof having balls upon their lower ends which are engaged in the sockets 9 formed between the plates 10 and 11 carried by the rear runners 12, it being obvious that by providing the ball and socket connection the runners 12 may rock.

A second pair of clamps 13 are engaged with the axle 4 and are connected to the jacks 6 by brace rods 14, there being a cross bar 15 connecting the clamps 13 and 5.

The front axle also has a pair of jacks 16 secured thereto by clamps 15', said jacks being connected to the front runners 17 in a manner similar to the rear runners. The plates 10 when used in connection with the front runners are provided with arms 16' to which the connecting rod 17' is engaged to steer the runners 17.

Journaled transversely of the frame 1 is a shaft 18 having keyed thereon bevel gears 19, 20 and 21. Meshing with the gear 20 is a gear 22 fixed to a shaft 23 which is rotatable to impart rotary movement to the shaft 18. The shaft 23 is shown with a crank handle 24 to facilitate the rotation thereof.

Shafts 25 and 26 have their forward ends provided with gears 27 and 28 which mesh respectively, with the gears 19 and 20, said shafts serving to actuate the two rear jacks 6 to raise or lower the runners 12.

Meshing with the gears 19 and 20 are gears 29 and 30 fixed to the rear ends of the shafts 31 and 32 which actuate the front jacks 16 in order to raise or lower the front runners 17. It will thus be seen that the shaft 23 is rotatable to impart rotary movement to the shaft 18 and to the shaft 25, 26, 31, 32 to simultaneously actuate the jacks 6 and 16 to raise or lower the front and rear runners. The rear runners 12 are connected to the side sills 2 of the frame by rods 33 which are connected to clips 34 carried by said sill, said rods serving to maintain the runners in proper position.

In Figure 6 is illustrated the manner in which the device is applied to rear drive axles only, and in which instance only two drive shafts 35 are employed which are geared to the actuating shaft 36.

Adapted to engage with the wheels 36' both front and rear, in case of a four wheel drive, are rims 37, said rims having transverse webs 38 to enable the rim to obtain traction in the snow in order that the vehicle can be easily propelled.

The webs 38 are provided with openings 39 to prevent snow accumulating on the webs.

The webs 38 connect with a vertical flange 40 in which are engaged traction calks 41 maintained in place by nuts 42 applied to the shanks of the calks in the openings 43.

It will be of course understood that the runners 12 and 16 will slide upon the snow and sustain the weight of the vehicle, and at which time the runners will be elevated above the treads of the rims 37. Of course when not in use the runners will be elevated to hold the same from contact with the roadway.

From the foregoing, it is thought that the construction, operation and many advantages of the herein described invention will be apparent to those skilled in the art, without further description, and it will be understood that various changes in the size, shape and proportion and minor details of construction, may be resorted to without departing from the spirit or sacrificing any of the advantages of the invention.

What is claimed is:—

1. The combination with the front of a motor vehicle, of screw jacks fixed thereto, runners, having plates carried thereby and providing sockets, balls carried by the jacks for engagement in the sockets, arms carried by the plates, a rod connecting the arms for simultaneously operating the arms to turn the runners, and means for simultaneously operating jacks to raise and lower the runners.

2. The combination with the front and rear driven axles of a motor vehicle, of clamps fixed thereto, screw jacks carried by the clamps, front and rear runners fixed to the clamps, upper and lower plates fixed to the runners, means for pivotally connecting the screws of the jacks between the plates, the upper plates of the front runners having arms carried thereby, a rod connecting the arms, means for shifting the rod to turn said front runners, and means for simultaneously operating all of the jacks to raise and lower all runners.

In testimony whereof I affix my signature.

SWAN H. OLSON. [L. S.]